United States Patent [19]
Yamazaki et al.

[11] 4,200,719
[45] Apr. 29, 1980

[54] METHOD OF PRODUCTION OF ACRYLONITRILE POLYMER WITH VINYLBENZYL SULFONIC ACIDS

[75] Inventors: Kaoru Yamazaki, Akashi; Shunichiro Kurioka; Takashi Hatano, both of Kobe; Sadame Asada, Takasago; Mariko Yasuda, Akashi, all of Japan

[73] Assignee: Kanegafuchi Kagaku Kogyo Kabushiki Kaisha, Osaka, Japan

[21] Appl. No.: 863,529

[22] Filed: Dec. 22, 1977

Related U.S. Application Data

[63] Continuation of Ser. No. 683,814, Jul. 6, 1976, abandoned.

[30] Foreign Application Priority Data

May 7, 1975 [JP] Japan .................................. 50-55228

[51] Int. Cl.$^2$ ........................ C08F 2/16; C08F 228/02
[52] U.S. Cl. ............................ 526/220; 260/29.6 AN; 526/240; 526/287
[58] Field of Search ................ 260/79.3 MU; 526/220

[56] References Cited

U.S. PATENT DOCUMENTS 3,060,157  10/1962  Goodman .................. 260/79.3 MU
3,720,745  3/1973   Konig ....................... 264/206
4,013,608  3/1977   Nagoshi .................... 260/32.6 N

FOREIGN PATENT DOCUMENTS 49-14546  4/1974  Japan .................................. 260/79.3 R Primary Examiner—C. A. Henderson
Attorney, Agent, or Firm—Moonray Kojima

[57] ABSTRACT

A method of producing an acrylonitrile copolymer of 40 to 65 weight percent acrylonitrile and mainly vinyl chloride and vinylidene chloride in amounts within the range $$102.8 < A + B + 1.29C < 107.4,$$

wherein, A is a mixture of olefinic monomers excluding B and C, in weight percents, mainly comprising acrylonitrile; B is vinyl chloride in weight percents; and C is vinylidene chloride in weight percents; wherein the polymerization is carried out in an aqueous solution of 45 to 65 weight percent dimethyl formamide; and in the presence of 0.2 to 8.0 weight percent of at least one of vinyl benzyl sulfonic acid, derivatives of vinyl benzyl sulfonic acid or salts thereof. The polymer has excellent non-inflammable properties.

6 Claims, No Drawings

METHOD OF PRODUCTION OF ACRYLONITRILE POLYMER WITH VINYLBENZYL SULFONIC ACIDS

This is a continuation of application Ser. No. 683,814 filed Jul. 6, 1976 now abandoned.

BACKGROUND OF THE INVENTION

This invention relates to a method of producing acrylonitrile copolymer having superior non-inflammability.

There are at least two well known methods of producing acrylonitrile polymers. One method employes solution polymerization in a homogeneous system with dimethyl sulfoxide or dimethyl formamide as a solvent for the copolymers of the acrylonitrile series. The other method employes emulsion polymerization in an aqueous system with an emulsifier such as any proper anionic surface active agent or cation surface active agent. These prior process have been used industrially.

However, the solution polymerization process has not yet been used for the production of acrylonitrile copolymer containing vinyl chloride which belongs to the so-called "modacrylic" fiber designation, having a small amount of acrylonitrile in the molecule.

The reason why the solution polymerization is not used for the production of such copolymer appears to be as follows. A chain transfer reaction between the solvent molecule and the free radical of the growing polymer molecule occurs too often, thereby resulting in a considerable decrease of mean degree of polymerization. Moreover, since the velocity of polymerization reaction is slow, it takes a long period for completion of the reaction, thereby resulting in the appearance of a deep color. These are disadvantages in the solution polymerization method of producing "modacrylic" fibers. Moreover, these disadvantages especially appear in the production of the copolymer of acrylonitrile series containing vinyl chloride.

Thus, for the production of acrylonitrile copolymer containing vinyl chloride, the emulsion polymerization has been ordinarily used.

If the emulsion polymerization process is compared with the solution polymerization process, there are apparent such advantages as the velocity of polymerization reaction of the former is larger than that of the latter and the degree of polymerization of the obtained polymer in the former is much greater than that in the latter. However, obtaining a spinning solution from the polymer obtained by using the emulsion polymerization is complex and difficult. After the polymerization process, the obtained polymer should be separated from the aqueous medium by salting out and filtration. After washing, granulation and drying the separated polymer, the spinning solution can be at last prepared by dissolving the dried polymer. This involved process is accompanied by a large expenditure of labor cost and investment cost. Moreover, use of a large amount of purified water is necessary. Such a method for the preparation of spinning solution can never be considered advantageous from the industrial and economic standpoints.

In order to overcome such deficiencies in the solution polymerization process and also in the emulsion polymerization process, technical studies have been carried out previously. For examples, the Japanese Patent Publication S. 49(1974)-14546, discloses a method of polymerization of a mixture of monomers containing 80 to 20 weight percent of acrylonitrile in a mixed solvent consisting of an organic solvent and water, especially, in a mixed solvent consisting of dimethyl formamide and water whose ratio of dimethyl formamide:water, is in the range of 60:40 to 85:15 by weight.

However, it is very difficult to carry out the production of acrylonitrile polymer containing vinyl chloride by the method mentioned above. The difficulty can be easily understood from the following. The above mentioned patent recommends use of sulfonated monomers as a third component for smooth polymerization reaction. Examples of such sulfonated monomers are sulfoalkyl esters of acrylic acid or methacrylic acid or their salts, styrene sulfonic acid or derivatives of styrene sulfonic acid or their salts, and methallyl sulfonic acid or its salts. However, in the case of polymerization of plural components system of acrylonitrile series containing vinyl chloride, using methallyl sulfonic acid or its salts in a mixed solvent whose ratio of dimethyl formamide to water is relatively small, the polymerization system becomes very unstable producing coagulation of the obtained polymerization reaction product or generating polymer precipitates and accumulations. Moreover, only a polymer of low degree of polymerization can be obtained. In order to improve this instability of the polymerization system, if the ratio of dimethyl formamide to water is increased, the resulting polymerization system becomes slightly more stable and the polymerization reaction barely proceeds in a stable manner. However, the degree of polymerization decreases considerably and the yield of polymer becomes low. Therefore, such a modification is not practical.

On the other hand, in case sulfoalkyl esters of acrylic acid or methacrylic acid or their salts are used as the third component, although the polymerization reaction can be carried out even in a mixed solvent whose ratio of dimethyl formamide to water is relatively small, polymer accumulations and precipitates appear within the polymer latex and it is difficult to obtain a stable and uniform latex. Furthermore, if the ratio of dimethyl formamide to water is increased when sulfoalkyl esters of acrylic acid or methacrylic acid or their salts are used as the third component, the tendency to generate polymer accumulations and precipitates in the polymer latex is improved, considerably. However, this modification also cannot be used practically because the degree of polymerization becomes too low and the yield of polymer is unsatisfactory. Thus, the method of the above Japanese Patent is difficult to apply to the polymerization of acrylonitrile series containing vinyl chloride.

SUMMARY OF THE INVENTION

After extensive study, the inventors have discovered a method of producing acrylonitrile polymer containing vinyl chloride by emulsion polymerization which completely overcomes the aforementioned and other deficiencies of the prior art., and makes it possible to obtain a spinning solution of such polymer easily and economically. The present invention encompasses a method of producing acrylonitrile polymer containing vinyl chloride having a superior non-inflammability. The inventive method comprises the steps of polymerization of a plural components system, producing a polymer comprising 40 to 65 weight percent acrylonitrile and mainly vinyl chloride and vinylidene chloride in amounts defined by the following relationship (1), in an aqueous solution of dimethyl formamide having a concentration of 45 to 65 weight percent, and using 0.2 to 8.0 weight percent of at least one of vinyl benzyl sulfonic acid or derivatives of vinyl benzyl sulfonic acid or their salts.

$$102.8 < A + B + 1.29C < 107.4 \tag{1}$$

wherein A is the amount of olefinic monomers in weight percents, excluding B and C, and mainly comprising acrylonitrile, B is the amount of vinyl chloride in weight percents and C is the amount of vinylidene chloride in weight percents.

DETAILED DESCRIPTION OF PREFERRED EMBODIMENTS

The invention will now be explained in further detail.

The first important consideration of the invention is the composition of the acrylonitrile polymer containing vinyl chloride, produced by the inventive method. The polymer comprises preferably 40 to 65 weight percent acrylonitrile, or more preferably 45 to 60 weight percent, and still more preferably 50 to 60 weight percent acrylonitrile; and mainly vinyl chloride and vinylidene chloride in amounts contained in the polymer of within the preferred ranges defined above in equation (1) above, or more preferably, within the range defined by the following relationship.

$$104.0 \leq A + B + 1.29C \leq 106.0 \tag{2}$$

wherein the A,B and C are above defined in equation (1).

The reason why such a composition mentioned above is necessary for the present invention can be understood from the following. If the value of $A + B + 1.29C$ in the relation (1) is smaller than 102.8 or larger than 107.4, the polymerization reaction system becomes unstable, with the progress of the polymerization reaction thereby producing coagulation of the obtained polymer latex and making it impossible to continue the polymerization reaction further, or by generating polymer precipitates or polymer accumulations in the polymer latex and making it impossible to obtain a stable polymer latex. Further, even if it is possible to obtain a stable polymer latex by decreasing the concentration of mixture of the three monomers whose composition is outside the range mentioned above as a necessary condition, the resulting polymer of such a composition can not have superior non-inflammability. Moreover, the productivity also decreases. Therefore, such a modification cannot be used advantageously from the technical and economic standpoint.

In the above, the reason why the content of acrylonitrile component is limited to be within the range of 40 to 65 weight percent, is as follows. Although it is possible to obtain stable polymerization reaction even if the amount of acrylonitrile is smaller than 40 weight percent, it is impossible in that use to obtain a synthetic fiber having sufficient mechanical property necessary for fibres. On the other side, if the amount of acrylonitrile is greater than 65 weight percent it is impossible to obtain stable polymerization reaction, and of course, impossible to obtain a stable polymer latex. Moreover, the non-inflammability of the synthetic fiber prepared from the obtained polymer is not so superior.

In the method of this invention, a small amount of mono-olefinic monomer which can co-polymerize with the main components can be used. Examples of such copolymerizable monoolefinic compounds are acrylic acid, methacrylic acid, esters of the foregoing acids, acrylic amide, methacrylic amide, vinyl acetate, vinyl bromide, and the like.

Furthermore, it is preferable to obtain a polymer of as nearly equal as possible composition during the polymerization reaction. Thus, monomers such as acrylonitrile, vinylidene chloride, etc., which have a tendency to copolymerize easily may each be charged continuously into the polymerization reaction system during the progress of reaction, in order to retain the composition of the mixture of unreacted monomers in the polymerization system as constant as possible.

In order to obtain a copolymer of the present invention having a plural component system comprising 40 to 65 weight percent of acrylonitrile and mainly vinyl chloride and vinylidene chloride whose contents are within the range defined by the formula $$102.8 < A + B + 1.29C < 107.4$$

the monomer composition to be used may be as follows: 38 to 62 parts by weight acrylonitrile; 9 to 23 parts by weight vinylidene chloride; and 22 to 48 parts by weight vinyl chloride. In this case, in order to obtain a copolymer having a composition as nearly equal as possible during the entire period of polymerization, a portion of the acrylonitrile to be used and also a portion of the vinylidene chloride are preferably continuously charged dropwise into the polymerization vessel during the progress of the polymerization reaction after the beginning of polymerization. Those portions were 16 to 26 parts (the word "parts" does not mean percents), of acrylonitrile and 6 to 15 parts vinylidene chloride, respectively.

In order to obtain a copolymer having a plural component system comprising 40 to 65 weight percent of acrylonitrile and mainly vinyl chloride and vinylidene chloride whose contents are within the range defined by the formula $$104.0 \leq A + B + 1.29C \leq 106.0$$

the monomer composition to be used may be as follows: 39 to 61 parts by weight acrylonitrile; 12 to 20 parts by weight vinylidene chloride and 24 to 45 parts by weight vinyl chloride. Preferably, 16 to 26 parts by weight acrylonitrile and 8 to 13 parts by weight of vinylidene chloride are charged dropwisely into the polymerization vessel during the progress of the polymerization reaction after the beginning of polymerization.

In order to obtain a copolymer having a plural component system comprising 45 to 60 weight percent acrylonitrile and mainly vinyl chloride and vinylidene chloride whose contents are within the range defined by the formula $$102.8 < A + B + 1.29C < 107.4$$

the monomer composition to be used may be as follows: 42 to 58 parts by weight acrylonitrile, 9 to 23 parts by weight vinylidene chloride; and 25 to 44 parts by weight vinyl chloride. Preferably, 18 to 25 parts by weight of acrylonitrile and 6 to 15 parts by weight vinylidene chloride are charged dropwisely into the polymerization vessel during the progress of polymerization reaction after the beginning of polymerization.

In order to obtain a copolymer having a plural component system comprising 50 to 60 weight percent acrylonitrile and mainly vinyl chloride and vinylidene chloride whose contents are within the range defined by the formula $$102.8 < A + B + 1.29C < 107.4$$

the monomer composition to be used may be as follows: 43 to 58 parts by weight acrylonitrile, 9 to 23 parts by weight vinylidene chloride and 25 to 40 parts by weight vinyl chloride. Preferably, 18 to 25 parts by weight acrylonitrile and 6 to 15 parts by weight vinylidene chloride are charged dropwisely into the polymerization vessel during the progress of polymerization reaction after the beginning of the polymerization.

In order to obtain a copolymer having a plural component system comprising 45 to 60 weight percent acrylonitrile and mainly vinyl chloride and vinylidene chloride whose contents are within the range defined by the formula $$104.0 \leq A + B + 1.29C \leq 106.0$$

the monomer composition to be used may be as follows: 43 to 57 parts by weight acrylonitrile; 12 to 20 weight parts vinylidene chloride and 27 to 41 parts by weight vinyl chloride. Preferably, 18 to 20 parts by weight acrylonitrile and 8 to 13 parts by weight vinylidene chloride are charged dropwisely into the polymerization vessel during the progress of polymerization reaction after the beginning of polymerization.

In order to obtain a copolymer having a plural components system comprising 50 to 60 weight percent acrylonitrile and mainly vinyl chloride and vinylidene chloride whose content are within the range defined by the formula $$104.0 \leq A + B + 12.9C \leq 106.0$$

the monomer composition to be used may be as follows: 44 to 57 parts by weight acrylonitrile, 12 to 20 parts by weight vinylidene chloride and 27 to 38 parts by weight vinyl chloride. Preferably, 18 to 25 parts by weight of acrylonitrile and 8 to 13 parts by weight vinylidene chloride are charged dropwisely into the polymerization vessel during the progress of the polymerization reaction after beginning of polymerization.

Although the above monomer composition parts enable the practice of the invention, other monomer composition parts and ratios may be used to practice the invention by controlling the monomer conversion to polymer.

Next, the second important consideration necessary for the practice of the invention is the use of 0.2 to 8 weight percent of at least one monomer of vinyl benzyl sulfonic acid, derivatives of vinyl benzyl sulfonic acid and salts of these sulfonic acid compounds, in the polymerization process of the production of acrylonitrile copolymer having vinyl chloride and vinylidene chloride therein. The monomer is used to improve the stability of the polymerization reaction system. It is impossible to carry out the polymerization reaction without producing any coagulation of the obtained polymer latex or without producing any precipitates of the generated polymer during the entire period of polymerization, if the monomer is not added into the polymerization system when it consists only of acrylonitrile, vinyl chloride and vinylidene chloride. This makes the second condition a necessary one for the preparation of a stable polymer latex. Examples of such monomers are m- and p- vinyl benzyl sulfonic acid; 2-chlor-4-vinyl benzyl sulfonic acid and sodium, potassium and ammonium salts of those sulfonic acids. The amount to be used is preferably within the range of 0.20 to 8.0 weight percent, as already stated hereinabove, or more preferably, 0.4 to 5.0 weight percent. In case the amount used is less than 0.2 weight percent, it is not sufficient to retain the polymerization reaction system is a stable latex state during the entire period of polymerization. On the other side, if the amount is more than 8.0 weight percent, no appreciable increase in the stabilization of the polymer latex due to the excess addition of the monomer can be confirmed. Accordingly, it is disadvantageous from the standpoint of production costs.

Although Japanese Patent S49(1974)-14546, mentioned above, uses a third component for obtaining stable polymerization reaction (such as alkyl esters of acrylic acid or methacrylic acid or salts of these acids and sulfonated monomers whose examples are styrene sulfonic acid or derivatives of styrene sulfonic acid or salts of these sulfonic acid compounds and methallyl sulfonic acid or its salts), it can be pointed out that, as already stated hereinabove, even if the third component is added to the polymerization reaction system, it is impossible to obtain stable polymerization reaction by the method of the above mentioned Japanese Patent without producing any coagulation of polymer latex or without any formation of polymer precipitation within the latex when the production of acrylonitrile polymer containing vinyl chloride is carried out. Moreover, the velocity of polymerization reaction is slow and the degree of polymerization of the obtained product is also low. These are disadvantages of the above mentioned Japanese patent.

However in contrast, the sulfonated monomer used as the third component in the present invention, such as vinyl benzyl sulfonic acid or derivatives of vinyl benzyl sulfonic acid or salts of those sulfonic acid compounds, has a remarkable effect on the stabilization of polymer latex much more superior than the sulfonated monomer used in the above mentioned Japanese Patent. Moreover, in the instant invention, the velocity of polymerization and the degree of polymerization of the obtained polymer are large. Therefore, the sulfonated monomer of the present invention is very advantageous for use in the production of acrylonitrile polymer containing vinyl chloride.

The third necessary condition of the present invention is the use of an aqueous solution of dimethyl formamide of 45 to 65 weight percent concentration as a solvent for the polymerization medium. In case the concentration is lower than 45 weight percent, the obtained polymer latex, sometimes, coagulates or a polymer precipitation occurs in the polymer latex. That is, the polymerization system becomes unstable with the progress of the polymerization reaction. On the other side, in case the concentration is higher than 65 weight percent, the polymerization velocity is rather slow, the degree of polymerization is low and again the stability of the obtained polymer latex becomes poor. The foregoing are the reasons why the concentration of dimethyl formamide is an aqueous medium is preferably within the range of 45 to 65 weight percent, and more preferably, within the range of 49 to 59 weight percent.

The monomer concentration in the reaction system is less than 35 weight percent, preferably, 30 weight percent. If the value of the monomer concentration reaction system is more than 35 weight percent, the polymerization reaction system becomes unstable with the progress of the polymerization reaction, producing thereby coagulation of the obtained polymer latex and making it impossible to carry out the polymerization any further, or generating polymer precipitates or polymer accumulations in the polymer latex and making it impossible to obtain a stable polymer latex.

It is possible to add a small amount of other organic conventional solvents which are soluble to the solvent. However, this is not an advantageous measure industrially, since the existence of such a component in the dimethyl formamide - water system makes it rather difficult to recover the solvent.

Furthermore, as a catalyst used for polymerizaton in the method of the present invention, conventional initiators of free radical type, such as persulphate or a combination of persulfate and sulfurous acid or bisulfite, azo compounds, such as azo-bis-dimethyl valeronitrile, and peroxides, such a benzoyl peroxide, can be used without any special limitation.

As just discussed, there are three necessary conditions to practice the invention. The object of the invention cannot be attained without the concurrence of the three conditions; any one or more which are unsatisfied will not enable the attainment of the object of the invention, which is, inter alia, to produce a stable polymer latex of acrylonitrile series having superior non-inflammability.

Furthermore, as methods of preparing a spinning solution from the polymer latex stably obtained by the present invention, there can be used, for example, a procedure to directly remove the water contained in the latex or to remove the water after adding a certain suitable amount of dimethyl formamide into the latex, or a combination of such procedures. However, it is preferably to use a procedure which removes directly a portion of water contained in the latex previously and then again remove the residual water after adding a certain amount of dimethyl formamide to the latex.

As mentioned above, the present invention has overcome the defect of the conventional emulsion polymerization and makes it possible to prepare a spinning solution directly from the polymer latex stably obtained by the method of the present invention. Moreover, the inventive process enables production of a synthetic fiber of acrylonitrile series having a superior non-inflammability from the spinning solution by the application of ordinary wet spinning technique.

In the following, the invention will be illustrated by actual examples. Moreover, it is to be understood that the invention is not to be limited by these examples.

EXAMPLES 1 and 2 AND COMPARATIVE EXAMPLES 1 AND 2

Polymerization was carried out, using a pressureproof polymerization reaction vessel whose inner volume was 15 liters. In each polymerization reaction, 98.2 parts of a mixture of monomers comprising acrylonitrile (AN), vinyl chloride (VC) and vinylidene chloride (VD) and 1.8 parts of sodium vinyl benzyl sulfonate (VBSA) were added into 260 parts of an aqueous solution of dimethyl formamide of 55 weight percent concentration, in the reaction vessel. As an initiator, ammonium persulfate and sodium bisulfite were used. After adjusting the pH value of the reaction system at 4.5, the polymerization reaction was allowed to start at a reaction temperature of 39° C. The polymerization time was 7 hours. The term "parts" or "percents" as used herein are in terms of weight unless otherwise designated.

The results on stability of the polymer latex obtained by each polymerization under the condition mentioned above and the non-inflammability of a fiber prepared by spinning a solution obtained directly from the latex, are shown in Table 1 corresponding to each composition of the produced polymer. The yield of polymer after the removal of the unreacted vinyl chloride was about 90 to 96%.

TABLE I

| No. | Composition of Polymer (Wt%) | | | | A + B + 1.29 C | Stability of polymer latex | Non-inflammability |
| --- | --- | --- | --- | --- | --- | --- | --- |
| | AN | VC | VD | VBSA | | | |
| Ex. 1 | 55.8 | 30.0 | 13.2 | 1.0 | 103.9 | Good | large |
| Ex. 2 | 55.6 | 21.8 | 21.7 | 0.9 | 106.3 | Good | Large |
| Comp Ex. 1 | 56.0 | 37.6 | 5.3 | 1.1 | 101.5 | Not Good | Medium |
| Comp Ex. 2 | 56.1 | 12.3 | 30.4 | 1.2 | 108.8 | Not Good | Medium |

Since the conditions applied for polymerization in Examples 1 and 2 satisfied the three necessary conditions set forth above, stable polymer latexes were obtained in those examples and fibers obtained by spinning solutions directly prepared from the polymer latexes also had superior non-inflammability. However, since the polymerization conditions in Comparative Examples 1 and 2 did not satisfy the three necessary conditions of the present invention, it was impossible to obtain stable polymer latexes and coagulation of latex or polymer precipitates were produced. Moreover, it was found that the non-inflammability of the fibers obtained from spinning dope prepared from the latexes in the comparative examples were not satisfactory.

EXAMPLES 3 to 5 AND COMPARATIVE EXAMPLES 3 AND 4

Each polymerization was carried out just the same as in Examples 1 and 2. Results on the stability of polymer latex and the non-inflammability of the fiber corresponding to the composition of each polymer are shown in Table 2.

As shown in Table 2, since the polymerization conditions of Examples 3 to 5 satisfied the three necessary conditions of the present invention, stable polymer latexes were obtained and fibers spun from spinning dope prepared from the obtained polymer latexes had superior non-inflammability, However, in Comparative Example 3, although the polymer latex was stable and the prepared synthetic fiber had fair non-inflammability, it was inferior in mechanical properties and in non-transparency, since it contained too little acrylonitrile.

TABLE 2

| No. | Composition of Polymer (wt %) | | | | A + B + 1.29C | Stability of Polymer latex | Non-inflammability |
|---|---|---|---|---|---|---|---|
| | AN | VC | VD | VBSA | | | |
| Ex. 3 | 46.2 | 37.4 | 15.3 | 1.1 | 104.4 | Good | Large |
| Ex. 4 | 51.1 | 33.0 | 14.9 | 1.0 | 104.3 | Good | Large |
| Ex. 5 | 60.4 | 22.7 | 15.7 | 1.2 | 104.6 | Good | Large |
| Comp Ex. 3 | 36.5 | 49.1 | 13.5 | 0.9 | 103.9 | Good | Large |
| Comp Ex. 4 | 72.0 | 9.6 | 17.4 | 1.0 | 105.0 | Not Good | Small |

Accordingly, the comparative examples' fibers cannot be useful as a synthetic fiber for practical uses. In case of comparative example 4, since the polymerization conditions did not satisfy the three conditions from the stand point of acrylonitrile being outside the range, the obtained polymer latex was unstable and it was impossible to carry out the polymerization reaction under agitation, disturbed by the coagulation of the polymer latex.

EXAMPLE 6; COMPARATIVE EXAMPLES 5 to 8

In these examples, the effect of sulfonated monomer on the stability of the resulting polymer latex was examined. As examples of sulfonated monomer, sodium vinyl benzyl sulfonate (VBSA), which is one of the compounds proposed in the present invention, was used in Example 6 and methacrylic acid sulfopropyl sodium salt (SPMA), p-styrene sodium sulfonate (SSS) and methallyl sodium sulfonate (SMAS) were used in comparative examples 6, 7 and 8, respectively.

The polymerization recipe of each example was as follows. 50.4 parts acrylonitrile, 30.7 vinyl chloride, 17.6 parts vinylidene chloride and 1.3 parts sulfonated monomer were used; mixing the foregoing with 270 parts of an aqueous solution of dimethyl formamide of 55 weight percent concentration, in a polymerization vessel. After adjusting the pH value of the polymerization system at 4.5, a polymerization reaction was allowed to start, charging 0.15 parts of ammonium persulfate and 0.15 parts of sodium bisulfite as the polymerization initiator, at 40° C. and the polymerization was carried out for 7 hours. In the above mentioned polymerization procedure, in order to obtain a copolymer having a composition as nearly as equal as possible during the entire period of polymerization, portions of the acrylonitrile and vinylidene chloride were continuously charged dropwisely into the vessel with the progress of the polymerization reaction. The portions were 20.8 parts of acrylonitrile and 10.4 parts of vinylidene chloride, respectively.

The composition of each obtained polymer was almost the same such as 55 weight percent acrylonitrile, 23 weight percent vinyl chloride and 21 weight percent vinylidene chloride (A+B+1.29 C=1.05 to 106.0) and accordingly, satisfied one of the three necessary conditions set forth above. The results are shown in Table 3.

TABLE 3

| No. | Sulfonated Monomer | | Polymer* Yield (%) | $\eta$ sp** | Stability of Polymer latex |
|---|---|---|---|---|---|
| | Kind | (Wt %) | | | |
| Ex. 6 | VBSA | 1.3 | 96.1 | 0.379 | Good |
| Comp. Ex. 5 | VBSA | 0.0 | — | — | Very unstable, coagulation soon after beginning of polymerization |
| Comp. Ex. 6 | SPMA | 1.3 | 83.8 | 0.278 | Great amount of accumulations and precipitates appear. |
| Comp. Ex. 7 | SSS | 1.3 | 91.4 | 0.342 | Same as above |
| Comp. Ex. 8 | SMAS | 1.3 | — | — | Unstable, coagulated after 3 hr. from start of polymerization |

Notes:
* = The yield of polymer was observed after removing the unrected vinyl chloride
** = The specific viscosity of polymer was observed on each dimethyl formamide solution containing 2 grams of polymer per 1 litre of the solvent, at 30° C.

Since Example 6 used the sulfonated monomer of the invention, the produced polymer latex was very stable, the yield of polymer was high and moreover, the degree of polymerization was also high as shown in Table 3. On the other hand, in the case of Comparative Example 5, wherein no sulfonated monomer was used, or comparative example 8 wherein SMAS was used as the sulfonated monomer, which is not a monomer used in the invention, the polymerization reaction system was very unstable and the obtained polymer latex was coagulated within several hours of polymerization time after the beginning of polymerization. Furthermore, in the case of comparative examples 6 or 7, wherein SPMA or SSS was used, respectively, although the polymerization reaction proceeded, the obtained polymer latex had a strong tendency to accumulate or to generate polymer precipitates and accordingly, it was almost impossible to obtain a stable polymer latex and moreover, the yield of polymer and also the degree of polymerization were low.

EXAMPLES 7 to 10 and COMPARATIVE EXAMPLES 9 and 10

The effect of concentration of aqueous solution of dimethyl formamide on the stability of polymer latex were examined. Each polymerization was carried out just the same as in Example 6, until the yield of polymer became about 90 to 96% adjusting the amount of ammonium persulfate (APS) within the range of 0.08 to 0.33 parts, wherein sodium bisulfite was always used in the amount equal to the amount of ammonium persulfate in weight. The properties of the obtained latexes are shown in Table 4.

TABLE 4

| No. | Concentration of aqueous solution of dimethyl formamide (wt %) | Amount of APS (parts) | Specific viscosity ($\eta$ sp) | Stability of polymer latex |
|---|---|---|---|---|
| Comp. Ex.9 | 43 | 0.08 | — | not good |
| Ex.7 | 48 | 0.11 | 0.461 | Good |
| Ex.8 | 53 | 0.14 | 0.414 | Good |
| Ex.9 | 53 | 0.18 | 0.302 | Good |
| Ex.10 | 63 | 0.24 | 0.265 | Good |
| Comp. Ex.10 | 68 | 0.33 | — | Not Good |

Since the polymerization conditions in Examples 7 to 10 satisfied the three necessary conditions of the present invention, the obtained polymer latexes were stable and the polymers of were of high degree of polymerization. IN both cases of Examples 7 and 10, the existence of small amounts of polymer precipitates in each polymer latexes were found.

In case of comparative example 9, since the concentration of dimethyl formamide solution was too low, although the polymerization velocity was large, the polymer latex coagulated almost completely after 3.5 hours of polymerization time from the beginning of polymerization and it was impossible to obtain a stable polymer latex.

In the case of comparative example 10, since the concentration of dimethyl formamide solution was too high, the polymer latex coagulated after 4 hours of polymerization from the beginning. EXAMPLE 11.

Polymerization was carried out as in Example 6, using 0.16 parts azo-bis-dimethyl valeronitrile as the polymerization catalyst, at the polymerization temperature of 55° C. for 20 hours.

The obtained polymer latex was partially dehydrated using a rotary vacuum evaporator and then the equal amount of dimethy formamide was added to the polymer latex and again the water contained in the polymer latex was removed until the water content become below 5 weight percent, to prepare a spinning dope. By wet spinning of the prepared spinning dope, in a spinning bath comprising an aqueous solution of dimethyl formamide of 60% concentration, an acrylic synthetic fiber having superior non-inflammability was obtained.

The foregoing description is illustrative of the principles of the invention. Numerous variations and modifications thereof would be apparent to the worker skilled in the art. All such variations and modifications thereof are to be considered to be within the spirit and scope of the invention.

What is claimed is:

1. A method of producing a copolymer comprising 50 to 65 weight percent acrylonitrile and mainly vinylchloride and vinylidene chloride in amounts defined by the formula $$102.8 < A + B + 1.29C < 107.4$$

wherein A is a mixture of olefinic monomers excluding B and C in weight percent and mainly comprising acrylonitrile, B is vinylchloride in weight percent and C is vinylidene chloride in weight percent;

wherein acrylonitrile, vinylchloride and vinylidene chloride in amounts suitable to produce said copolymer having constituent amounts within the range set forth in the above formula are polymerized in an aqueous solution containing 45 to 65 weight percent concentration of dimethyl formamide and in the presence of 0.20 to 8.0 weight percent of at least one monomer selected from m- and p- vinyl benzyl sulfonic acid, 2-chlor-4-vinyl benzyl sulfonic acid and sodium, potassium and ammonium salts of the aforementioned sulfonic acids with good stability of latex at yields of not less than 90%.

2. The method of claim 1, wherein said A, B and C are within the range defined by $104.0 \leq A + B + 1.29 \leq 106.0$.

3. The method of claim 1, wherein the concentration of dimethyl formamide in aqueous solution is in the range of 49 to 59 weight percent.

4. The method of claim 1, wherein said sulfonic acid monomer comprises 0.4 to 5.0 weight percent; said copolymer comprises 50 to 60 weight percent acrylonitrile; and the concentration of dimethyl formamide in aqueous solution is within the range of 49 to 59 weight percent, and wherein A, B and C are within the range $104.0 \leq A + B + 1.29C \leq 106.0$.

5. The method of claim 1, wherein said copolymer comprises 50 to 60 weight percent acrylonitrile.

6. The method of claim 1, wherein said sulfonic acid monomer comprises 0.4 to 5.0 weight percent.

* * * * *